No. 614,079. Patented Nov. 15, 1898.
F. R. BLOUNT.
HYDROCARBON BURNING APPARATUS OR LAMP.
(Application filed Nov. 12, 1897.)
(No Model.) 2 Sheets—Sheet 1.
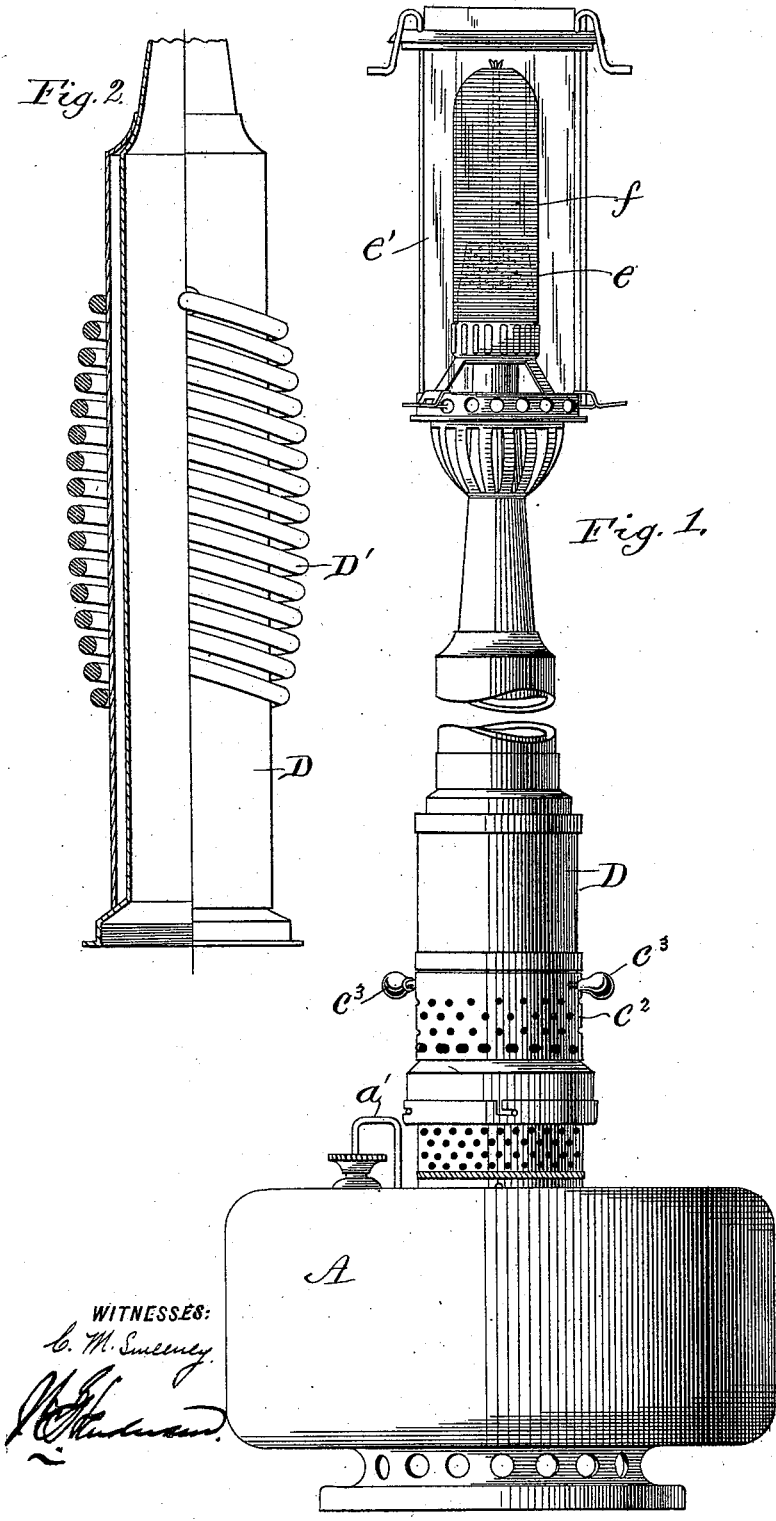

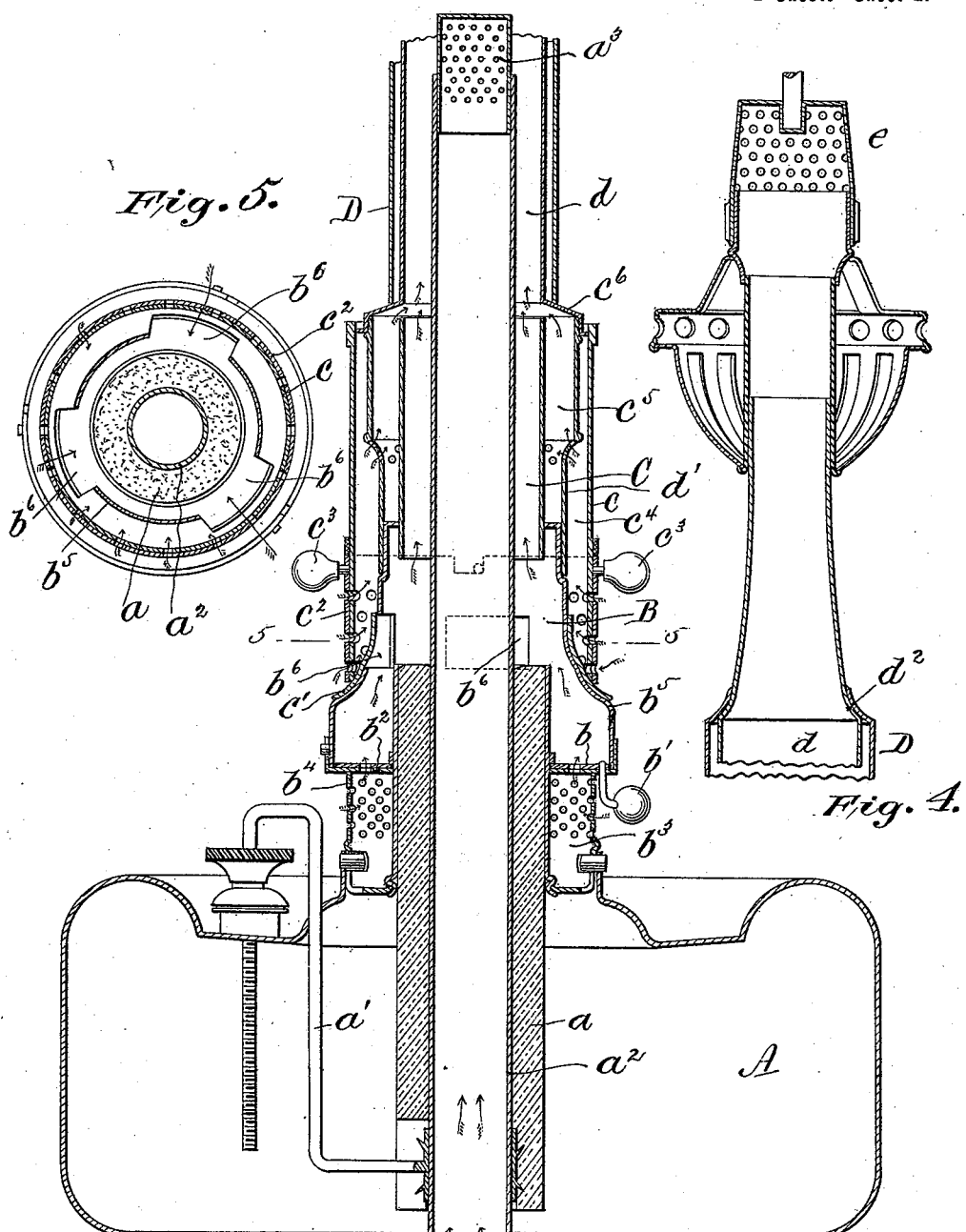

UNITED STATES PATENT OFFICE.

FREDERICK R. BLOUNT, OF NEW YORK, N. Y.

HYDROCARBON-BURNING APPARATUS OR LAMP.

SPECIFICATION forming part of Letters Patent No. 614,079, dated November 15, 1898.

Application filed November 12, 1897. Serial No. 658,317. (No model.)

*To all whom it may concern:*

Be it known that I, FREDERICK R. BLOUNT, a citizen of the United States, residing at New York, in the county of New York and State of New York, have invented certain new and useful Improvements in Hydrocarbon-Burning Apparatus or Lamps, of which the following is a specification, reference being had therein to the accompanying drawings.

My invention relates to that class of hydrocarbon lamps or heaters by means of which a smokeless flame of a high temperature is produced from a liquid or molten hydrocarbon through the instrumentality of a primary burner or generator which vaporizes the hydrocarbon and a secondary burner removed from the primary burner, the vapor produced at the primary burner being mixed with air and conveyed to the secondary burner, where it is converted into a smokeless flame of high temperature, generally known as a "blue" flame. Heretofore in this class of lamps and heaters the vapor, heavily laden with carbon, has been produced at the primary burner or generator by a smothering device inclosing the burner or generator and which, suppressing the combustion by checking the same from above, produced the carbon-laden vapor. I have discovered that better results may be secured by checking the draft of air to the primary burner from below, instead of smothering the flame from above, in retarding the combustion to produce the vapor without consuming the same.

My new lamp is preferably of the central-draft type and embodies certain improvements, as will hereinafter appear.

In the accompanying drawings, Figure 1 is an elevation, with the central portion of the mixing-chamber tube broken out, of a lamp embodying my invention; and Fig. 2 is a view, partly in section and partly in elevation, on a slightly-larger scale than Fig. 1, of the mixing-chamber tube. Fig. 3 is a vertical section of the lamp with the mixing-chamber tube broken off, and Fig. 4 is a vertical section of the upper part of the mixing-chamber tube and of the upper or secondary burner. Fig. 5 is a horizontal section on line 5 5 of Fig. 3.

A denotes the oil-reservoir of the lamp, into which extends the wick $a$ of the primary burner, and which wick in practice will preferably be provided with a screw-actuated raising and lowering device $a'$.

My improved lamp is preferably of the central-draft type and is therefore herein shown as being provided with a central air-tube $b^2$, opening into the base of the lamp and extending upward into or communicating with the mixing-chamber $d$, in which the vapor generated at the primary burner is mixed with air on its way to the secondary burner, as will be presently explained, the top of said air-tube being preferably provided with a perforated thimble $a^3$, forming a screen, to check the free upward flow of air, and the wick $a$ being an annular one surrounding the said air-tube $a^2$.

Surrounding the top of the wick $a$ of the primary burner is the combustion-chamber B, provided at its bottom with a shutter $b$, made in the form of an annular perforated plate, said shutter being provided with a handle $b'$, by means of which it may be rotated slightly to bring its holes or perforations into register with similar holes or perforations formed in the diaphragm $b^2$ at the base of the combustion-chamber for the admission of air when the lamp is first lighted, and said shutter may then be turned slightly, if necessary, to partially close the said holes or perforations in the said base-plate or diaphragm, as may be desired, in regulating the draft, and may be turned to entirely close said holes when the lamp is to be extinguished. Below the perforated diaphragm $b^2$ is an air-chamber $b^3$, the outer wall $b^4$ of which is perforated for the admission of air to said chamber.

Owing to the fact that the free admission of air to the chamber B is checked by moving the shutter $b$ to the proper position to close the openings through which air is admitted to said chamber to the desired degree, the said chamber becomes a combined vapor-generating and combustion chamber, the vapor-generating effect being due to the fact that only enough air is admitted to said chamber to support a very small flame at the top of the wick $a$, sufficient to vaporize the liquid hydrocarbon passing up said wick, with very little consumption of the same by combustion.

Above the combustion-chamber B is a flue C, which forms the connection between the said combustion-chamber and the mixing-chamber $d$ within the tube D. The outer wall $b^5$ of the combustion-chamber is preferably provided with several lighting-openings $b^6$, through any one or all of which a lighted match may be introduced to light the wick of the primary burner.

It is desirable that the air which is to be mingled with the vapor in the mixing-chamber should be heated before passing to said chamber. To this end I have provided the lower part of the hood or sleeve $c$ with a series of holes or air-inlets, so that the air passing to the mixing-chamber will be heated by coming in contact with or being brought adjacent to the wall of the combustion-chamber. The holes or air-inlets in the lower part of the sleeve $c$ may be closed more or less to regulate the indraft of air by means of a shutter consisting of second sleeve $c^2$, provided with one or more handles $c^3$, by which it may be turned when desired. The sleeve $c$ is provided with a foot-plate $c'$, suitably secured thereto, and which rests upon the outer side of the wall of the combustion-chamber. When the lamp is to be lighted, the sleeve $c$, carrying the sleeve $c^2$, is lifted to allow access to the openings $b^6$ in the wall of the combustion-chamber. The openings $b^6$ are normally closed by the sleeve $c$ and its foot-plate $c'$, which surround the wall of the combustion-chamber.

The air which enters the holes or inlets in the lower part of the sleeve $c$ passes into the outer air-chamber $c^4$ and thence through the perforated wall $d'$ to the inner air-chamber $c^5$, the top of which opens into the bottom of the mixing-chamber $d$. The top wall of the inner air-chamber $c^5$ is preferably formed as a somewhat abrupt shoulder $c^6$, which will give a sharp turn to the air at this point, and thus cause it to be projected into the ascending vapor rising from the primary burner through the flue C to cause a thorough mingling of the air and the vapor. The air passing through the central air-tube $a^2$, extending through the combustion-chamber B and the flue C, also becomes heated from the primary burner, and thus all of the air entering the mixing-chamber $d$ will be properly heated, so that vapor with which the air is mingled in the said chamber will not be cooled.

My improved hydrocarbon-burning apparatus, as herein shown, is, as will be obvious, designed for use as a lamp, although it might with slight modifications be utilized as a heating apparatus, and in the use of my invention as a lamp I prefer to utilize the secondary burner $e$, at which a very hot blue flame is produced for the heating of an incandescent mantle $f$, which is suitably secured in a position surrounding the said secondary burner, the said mantle being preferably inclosed by an ordinary glass chimney $e'$.

To avoid condensation of the vapor generated at the primary burner on the inside of the wall of the mixing-chamber, the said chamber is preferably provided with double walls, so as to form a space for dead-air between the inner and outer walls thereof, and which will serve as a non-conductor to prevent too much radiation of the heat or to prevent the cool outer air from coming in contact with the inner wall.

As it will be desirable to remove the tube D, within which is the mixing-chamber, from the lamp at times, the said tube is preferably provided with a hand-shield D', so that it can be readily handled without burning the person taking hold of it, this shield in the form of my invention herein shown consisting of a spirally-wound wire attached to the said tube and having its spirals properly separated, so that air may freely circulate through the same to keep the shield cool.

The mixing-chamber is tapered at its upper portion to form a contracted flue, which serves to improve the draft and causes a better mixture of the air and vapor than would otherwise result. The base of the contracted part of the flue of the mixing-chamber is formed as a shoulder $d^2$, which serves to check the upward movement of the air and vapor at this point.

In the class of lamps to which my invention relates it is desirable that there should be little or no consumption of the carbon-laden vapor generated at the primary burner, and I have discovered that by checking the draft for the inlet of air from below the said burner rather than by smothering the flame of the said burner from above the vapor can be generated with the least possible consumption and waste. I have also discovered that by combining a primary burner at which the vapor is generated and a secondary burner at which the said vapor is consumed to produce a blue smokeless flame of high temperature with a central air-tube through which a portion of the air which is to be mingled with the vapor in the mixing-chamber is conveyed to the said chamber through the annular wick of the primary burner, so that the air entering the mixing-chamber through the said central tube becomes highly heated by the primary burner, better results are secured than where a solid or other non-central-draft wick is employed. I do not, however, wish to be understood as limiting my invention to a lamp or heater of the central-draft type, as I have found that very good results may be secured in a lamp or heater of the general type shown, but in which a solid or non-central-draft wick is employed.

Having thus described my invention, I claim and desire to secure by Letters Patent—

1. In a heating or lighting apparatus, the combination with a primary or vapor-producing burner or generator, a combined vapor-generating and combustion chamber in which said burner is located, a secondary burner removed from said primary burner, and a mixing-chamber between said combustion-chamber and said secondary burner and in which mixing-chamber the carbon-laden vapor is mingled with air, of means, located below the said primary burner, for admitting air to said primary burner when the same is first lighted and for subsequently checking the inflow of air thereto and thereby smothering the flame thereof to produce carbon-laden vapor with little or no consumption of the same.

2. In a heating or lighting apparatus, the combination with a primary or vapor-producing burner or generator, a combined vapor-generating and combustion chamber in which said burner is located, a secondary burner removed from said primary burner, and a mixing-chamber between the said combustion-chamber and said secondary burner and in which mixing-chamber the carbon-laden vapor is mingled with air, of means for checking the inflow of air to said primary burner and consisting of a perforated diaphragm, as $b^2$, and an adjustable perforated shutter or disk, as $b$, which latter may be turned more or less to check the inflow of air to the combustion-chamber in which said primary burner is located.

3. In a heating or lighting apparatus, the combination with a primary burner or generator, a combustion-chamber in which the same is located, a flue above the said combustion-chamber, an air-chamber surrounding said flue, a mixing-chamber above said flue and a secondary burner above said mixing-chamber, of a hood or sleeve surrounding said air-chamber and extending downward partially around the said combustion-chamber and serving to draw air into the said air-chamber from the proximity of said burner so that it will be more or less heated, before entering said air-chamber, by coming adjacent to the wall of the combustion-chamber, and by means for regulating the admission of air to said air-chamber.

4. In a heating or lighting apparatus, the combination with a primary burner, a combined vapor-generating and combustion chamber in which said burner is located, and a secondary burner removed from said primary burner, of a mixing-chamber between the said burners and which mixing-chamber is provided with double walls to form an air-space between the inner and outer walls thereof; whereby condensation of the vapor produced at the primary burner on the inside of the wall of said mixing-chamber will be avoided.

5. In a heating or lighting apparatus, the combination with a primary burner, a combined vapor-generating and combustion chamber in which said primary burner is located, and a secondary burner removed from said primary burner, of a mixing-chamber between the said burners and which mixing-chamber is provided with double walls to form an air-space between the inner and outer walls thereof; whereby condensation of vapor produced at the primary burner on the inside of the wall of said mixing-chamber will be avoided; the tube forming said mixing-chamber being provided with a hand-shield so that it may be conveniently removed when hot, if necessary.

6. In a heating or lighting apparatus, the combination with a primary burner, a secondary burner removed therefrom, and a mixing-chamber between said burners, of a combustion-chamber in which said primary burner is placed and the wall of which is provided with one or more lighting-openings, and a movable hood or sleeve surrounding the wall of said combustion-chamber and which hood or sleeve may be lifted to permit of access to said lighting-openings, said hood or sleeve being constructed to draw in the air, which is to enter said mixing-chamber, adjacent to the wall of said combustion-chamber, so that the entering air will be more or less heated.

7. In a heating or lighting apparatus, the combination with a primary burner, a secondary burner removed therefrom, and a mixing-chamber between said burners, of a combustion-chamber in which said primary burner is placed and which is provided with a lighting-opening, and a movable hood or sleeve surrounding the wall of said combustion-chamber and which is adapted to be lifted to permit of access to said lighting-openings, said hood or sleeve being provided with holes or perforations for the indraft of air to said mixing-chamber, and a shutter by means of which the inflow of air may be regulated.

8. In a heating or lighting apparatus, the combination with a primary burner and a combustion-chamber in which said burner is located, of a secondary burner removed from said primary burner, an extended mixing-chamber above said combustion-chamber and in which mixing-chamber the vapor generated at the said primary burner is mingled with air, and an imperforate air-tube extending through the wick of said primary burner and also through the said combustion-chamber and opening at its top into said mixing-chamber.

9. In a heating or lighting apparatus, the combination with a primary burner and a combustion-chamber in which said burner is located, of a secondary burner removed from said primary burner, an extended mixing-chamber above said combustion-chamber and in which mixing-chamber the vapor generated at the said primary burner is mingled with air, means for regulating the admission of air to said mixing-chamber, and an imperforate air-tube extending through the wick of said primary burner and also through the said combustion-chamber and opening at its top into said mixing-chamber.

10. In a heating or lighting apparatus, the combination with a primary burner, a combustion-chamber surrounding the same, a flue above the said combustion-chamber, a mixing-chamber above the said flue, and a secondary burner above said mixing-chamber, of an air-chamber surrounding the said flue and communicating with the base of the said mixing-chamber, said air-chamber being provided at its top with an abrupt shoulder to cause the air passing from the same at the top of said flue into said mixing-chamber to be projected into the volume of vapor passing up said flue.

11. In a heating or lighting apparatus, the combination with a primary burner, a secondary burner removed therefrom, and a combined vapor-generating and combustion chamber into which the wick of said primary burner extends, of a tube between said burners and which forms a mixing-chamber in which the vapor generated at the primary burner is mingled with air on its way to said secondary burner, said tube being removable from the lower portion of the lamp and being provided with a hand-shield so that it may be conveniently taken off when hot, if necessary.

In testimony whereof I affix my signature in presence of two witnesses.

FREDERICK R. BLOUNT.

Witnesses:
   HENRY CALVER,
   M. L. SLATER.